United States Patent
Niwata

(10) Patent No.: US 10,890,244 B2
(45) Date of Patent: Jan. 12, 2021

(54) POWER TRANSMISSION DEVICE

(71) Applicant: HONDA MOTOR CO., LTD., Tokyo (JP)

(72) Inventor: Kenji Niwata, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 119 days.

(21) Appl. No.: 16/232,493

(22) Filed: Dec. 26, 2018

(65) Prior Publication Data

US 2019/0203824 A1 Jul. 4, 2019

(30) Foreign Application Priority Data

Dec. 28, 2017 (JP) ................................. 2017-254926

(51) Int. Cl.
*F16H 57/027* (2012.01)
*F16H 57/021* (2012.01)
*F16H 48/19* (2012.01)

(52) U.S. Cl.
CPC ........... *F16H 57/027* (2013.01); *F16H 48/19* (2013.01); *F16H 57/021* (2013.01)

(58) Field of Classification Search
CPC ............................... F16H 57/027; F16H 48/19
See application file for complete search history.

(56) References Cited

U.S. PATENT DOCUMENTS

2014/0262676 A1* 9/2014 Niwata .................... F16D 25/12
  192/85.24
2014/0366956 A1 12/2014 Wiens et al.
2018/0245642 A1* 8/2018 Niwata .................... F16D 25/14
2018/0266481 A1* 9/2018 Fujinuma ................ F16H 48/08
(Continued)

FOREIGN PATENT DOCUMENTS

CN 103727213 A 4/2014
CN 104228722 A 12/2014
(Continued)

OTHER PUBLICATIONS

Office Action dated Aug. 20, 2019, issued in counterpart to JP Application No. 2017-254926, with English translation (7 pages).
(Continued)

Primary Examiner — Terence Boes
(74) Attorney, Agent, or Firm — Westerman, Hattori, Daniels & Adrian, LLP

(57) ABSTRACT

A power transmission device (100) includes: a rotary shaft (4) extending in the vehicle width direction to transmit power to drive wheels of the vehicle; a rotary parts housing chamber (16) disposed on the end section or in its vicinity of the rotary shaft (4) in the axial direction and adapted to house rotary parts including a clutch (5R); and a breather chamber (81) disposed on the outside (the upper side) of the rotary shaft (4), wherein a first communication passage (80) is provided to communicate with the breather chamber (81) and the rotary parts housing chamber (16). The oil intruded into the breather chamber (81) is discharged from the breather chamber (81) through the first communication passage (80) and is led to the rotary parts housing chamber (16) by the negative pressure due to the pull-in to the rotary parts housing chamber (16) accompanying rotation of the rotary parts.

5 Claims, 8 Drawing Sheets

SECTION B-B

(56) References Cited

U.S. PATENT DOCUMENTS

| | | | | |
|---|---|---|---|---|
| 2018/0283244 | A1* | 10/2018 | Fujinuma | F01M 1/02 |
| 2018/0335094 | A1* | 11/2018 | Yoshida | F16D 25/0638 |
| 2018/0335128 | A1* | 11/2018 | Yamaguchi | F16H 57/037 |
| 2019/0242443 | A1* | 8/2019 | Yamaguchi | F16D 25/0638 |
| 2019/0316670 | A1* | 10/2019 | Kobayashi | F16H 48/19 |
| 2020/0149599 | A1* | 5/2020 | Niwata | F16D 25/0638 |

FOREIGN PATENT DOCUMENTS

| | | |
|---|---|---|
| JP | 10-288252 A | 10/1998 |
| JP | 2007-278372 A | 10/2007 |
| JP | 2008-57633 A | 3/2008 |
| JP | 2008-64189 A | 3/2008 |
| JP | 2014-194242 A | 10/2014 |
| JP | 2017-15156 A | 1/2017 |
| JP | 2017-207164 A | 11/2017 |

OTHER PUBLICATIONS

Office Action dated Jan. 19, 2019, issued in counterpart CN application No. 201811515823.2, with English translation. (10 pages).
Chinese Search Report dated Jan. 7, 2020, issued in counterpart application No. 2018115158232. (2 pages).

* cited by examiner

SECTION B-B

SECTION C-C

ENLARGED D

POWER TRANSMISSION DEVICE

CROSS-REFERENCE OF RELATED APPLICATION

This application claims priority of Japanese Patent Application No. 2017-254926 filed in Japan on Dec. 28, 2017, the entire contents of which are incorporated herein by reference.

TECHNICAL FIELD

The present invention relates to a power transmission device to transmit power from a drive source such as an engine mounted on a vehicle to drive wheels.

BACKGROUND OF THE INVENTION

As a power transmission device for transmitting power from a drive source such as an engine in a vehicle to drive wheels, for example, as shown in Japanese published unexamined application No. 2014-194242, there is a power transmission device comprising a gear mechanism consisting of a drive bevel gear (pinion gear) integrally rotated with a drive shaft extending in the longitudinal direction of the vehicle and a driven bevel gear (ring gear) adapted to mesh with the drive bevel gear; a rotary shaft disposed perpendicularly to the drive shaft and integrally rotated with the driven bevel gear; and right and left hydraulic clutches d posed between right and left ends of the rotary shaft and wheel axes connected to a pair of drive wheels.

In the power transmission device of Japanese published unexamined application No. 2014-194242, in the axial direction of the rotary shaft, a gear chamber in which the gear mechanism is housed is disposed in the center and a clutch chamber adapted to house the right and left hydraulic clutches on both sides of the gear chamber is disposed. And, an oil pump is provided to feed oil stored in the gear chamber to the right and left hydraulic clutches. Oil sucked from the central gear chamber is fed to a piston chamber of the clutch by the oil pump and then, discharged into the clutch chambers on both sides. Oil discharged into the clutch chamber is returned to the central gear chamber through such as a communication hole adapted to communicate with the clutch chamber and the gear chamber. Namely, this power transmission device has a constitution in which oil circulates between the central gear chamber and the right and left clutch chambers. Also, provided on the upper section of the gear chamber is a breather chamber adapted to communicate with the gear chamber or the clutch chamber. A breather pipe adapted to communicate with the outside of the power transmission device is connected to the breather chamber and in the case where the pressure of gas (air) within the gear chamber and the clutch chamber was high, gas in the gear chamber and the clutch chamber is caused to discharge (so-called air discharge is conducted) to the outside of the power transmission device through the breather chamber.

In the power transmission device with the above-mentioned constitution, there a concern that a phenomenon that oil in the gear chamber and the clutch chamber intrudes into the breather chamber, especially at high-speed running or at turning of the vehicle may occur. In this case, there is no problem if all the oils intruded into the breather chamber return to the gear chamber and the clutch chamber, but in the conventional power transmission device, there was not provided an effective mean efficiently (actively) return the oil intruded into the breather chamber to the gear chamber and the clutch chamber. Accordingly, in such a case as an amount of the oil intruded into the breather chamber became excessive or the oil level within the breather chamber is largely inclined at high-speed running or at turning of the vehicle, there was a possibility that the oil within the breather chamber spouts out to the outside (into the atmosphere) of the power transmission device through the breather pipe, the so-called oil blow-off occurs. With this, there was a problem that contamination by the oil has been caused by splashing of the oil to the surroundings or the outside of a place in which the power transmission device is housed.

There is a need to provide a power transmission device which can effectively suppress oil from spouting out of a breather chamber in the atmosphere by improving the return property of the oil intruded into the breather chamber to a clutch chamber (a rotary parts housing chamber) and a gear chamber.

SUMMARY OF THE INVENTION

A power transmission device according to one embodiment of the present invention is provided, in which a power transmission device (100) mounted on a vehicle comprises: a rotary shaft (4) extending in the vehicle width direction to transmit power to drive wheels of the vehicle; a gear (3) disposed on the rotary shaft (4) to transmit power to the rotary shaft (4); a gear chamber (15) adapted to house the gear (3); a rotary parts housing chamber (17) disposed on the end section or in its vicinity of the rotary shaft (4) in the axial direction and adapted to communicate with the gear chamber (15) and to house rotary parts including a clutch (5L); and a breather chamber (81) adapted to communicate with the gear chamber (15) and to communicate with the outside of the power transmission device (100), wherein a first communication passage (80) is provided to communicate with the breather chamber (81) and the rotary parts housing chamber (17) so as to connect inner spaces of the breather chamber (81) and the rotary parts housing chamber (17) in fluid and air communication with each other.

According to the power transmission device of the embodiment of the present invention, in the case where oil intruded into the breather chamber at high-speed running or at turning of the vehicle, the oil intruded into the breather chamber is discharged from the breather chamber through the first communication passage and is led to the rotary parts housing chamber by the negative pressure due to the pull-in to the rotary parts housing chamber accompanying the rotation of the rotary parts such as the clutch. And then, the oil is returned to the gear chamber from the rotary parts housing chamber. With this, since the return property of the oil intruded into the breather chamber to the gear chamber through the rotary parts housing chamber can be effectively improved, even in the case where the oil intruded into the breather chamber, it is possible to effectively suppress the oil from spouting out of the breather chamber to the outside.

Also, in this power transmission device, a breather pipe (83) adapted to communicate with the breather chamber (81) and the outside is provided, in which a suction port (80a) of the first communication passage (80) can be situated in such a manner that the level (L) of the oil intruded into the breather chamber (81) at turning of the vehicle reaches, the suction port (80a) of the first communication passage (80) prior to reaching an intake port (83a) of the breather pipe (83) within the breather chamber (81).

According to this constitution, since the oil level at turning of the vehicle reaches the suction port of the communication passage prior to reaching the intake port of the breather pipe, the oil intruded into the breather chamber no longer reach the intake port of the breather pipe and it is therefore possible to more effectively prevent the oil from spouting out of the breather pipe.

Further, to attain the above-mentioned object, a power transmission device according to another embodiment of the present invention is provided, in which a power transmission device (100) mounted on a vehicle comprises: a rotary shaft (4) extending in the vehicle width direction to transmit driving power (a driving force) to drive wheels of the vehicle; a gear (3) disposed on the rotary shaft (4) to transmit power to the rotary shaft (4); a gear chamber (15) adapted to house the gear (3); a rotary parts housing chamber (16) disposed on the end section or in its vicinity of the rotary shaft (4) in the axial direction and adapted to communicate with the gear chamber (15) and to house rotary parts including a clutch (5R); a breather chamber (81) adapted to communicate with the gear chamber (15) and to communicate with the outside of the power transmission device (100); a taper roller bearing (85) supporting the rotary shaft (4) to a case (9) of the power transmission device (100); and a bearing housing chamber (86) adapted to communicate with the gear chamber (15) and to house the taper roller bearing (85) wherein a second communication passage (82) is provided to communicate with the breather chamber (81) and the bearing housing chamber (86) so as to connect inner spaces of the breather chamber (81) and the bearing housing chamber (86) in fluid and air communication with each other.

Still further, in this power transmission device, the taper roller bearing (85) may be situated in such a manner that the small diameter side (85a) is disposed on the second communication passage (82) side within the bearing housing chamber (86), while the large diameter side (85b) is disposed on the gear chamber (15) side.

According to the power transmission device of the embodiment of the present invention, in the case where the oil intruded into the breather chamber at high-speed running or at turning of the vehicle, the oil intruded into this breather chamber is discharged from the breather chamber through the second communication passage and led to the bearing housing chamber by the negative pressure due to the pull-in of the taper roller bearing. And then, the oil is returned to the gear chamber from the bearing housing chamber. With this, since the return property of the oil intruded into the breather chamber to the gear chamber through the bearing housing chamber can be effectively improved, even in the case where the oil intruded into the breather chamber, it is possible to effectively suppress the oil from spouting out of the breather chamber to the outside.

Incidentally, the reference signs in parentheses described above show figure reference numerals of the corresponding constituent elements in the embodiments described later for the purpose of reference.

EFFECT OF THE INVENTION

According to a power transmission device of the embodiments of the present invention, by improving the return property of the oil intruded into a breather chamber to a rotary parts housing chamber and a gear chamber, it is possible to effectively suppress the oil from spouting out of the breather chamber in the atmosphere.

DETAILED DESCRIPTION OF PREFERRED EMBODIMENTS OF THE INVENTION

Figure 1B:
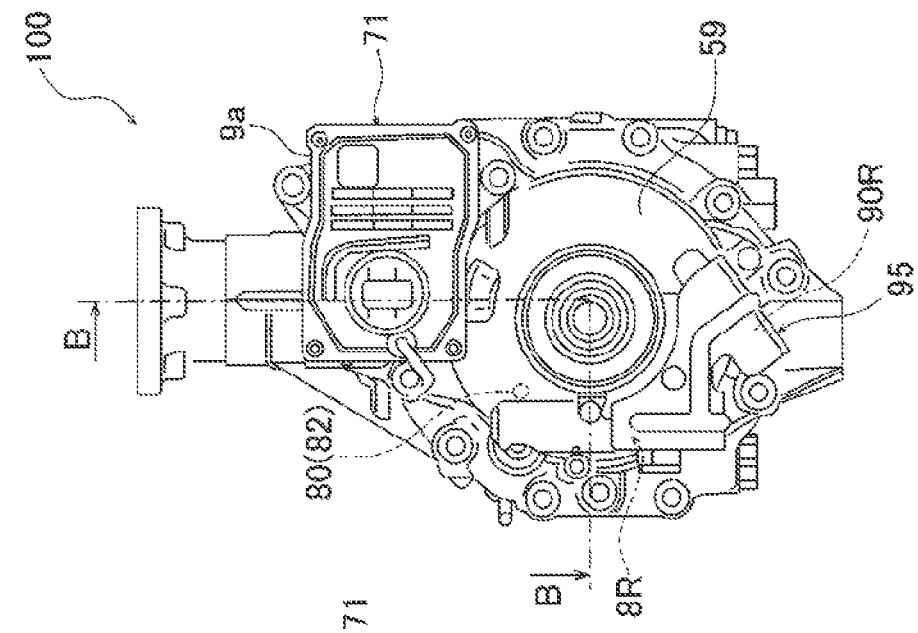
FIGS. 1(*a*) and 1(*b*) are views showing the outer appearance configuration of a power transmission device according to one embodiment of the present invention, in which FIG. 1(*a*) is a plan view thereof and FIG. 1(*b*) is a side view thereof.
Figure 1A:
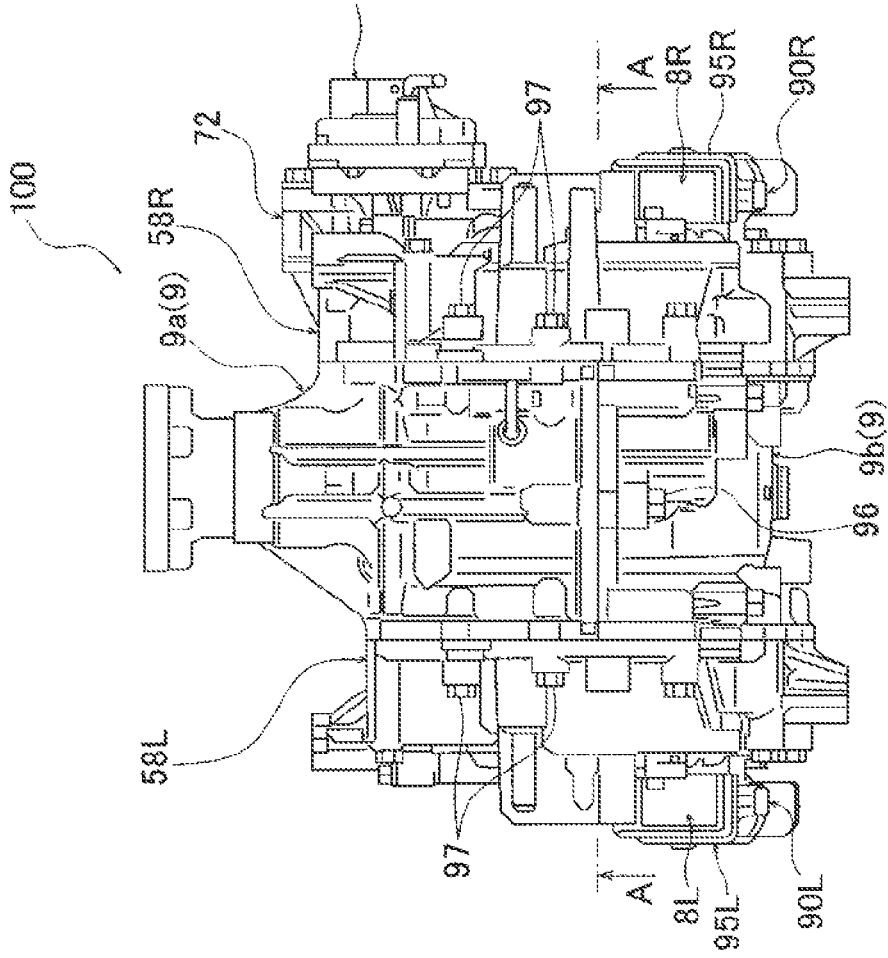
Figure 2:
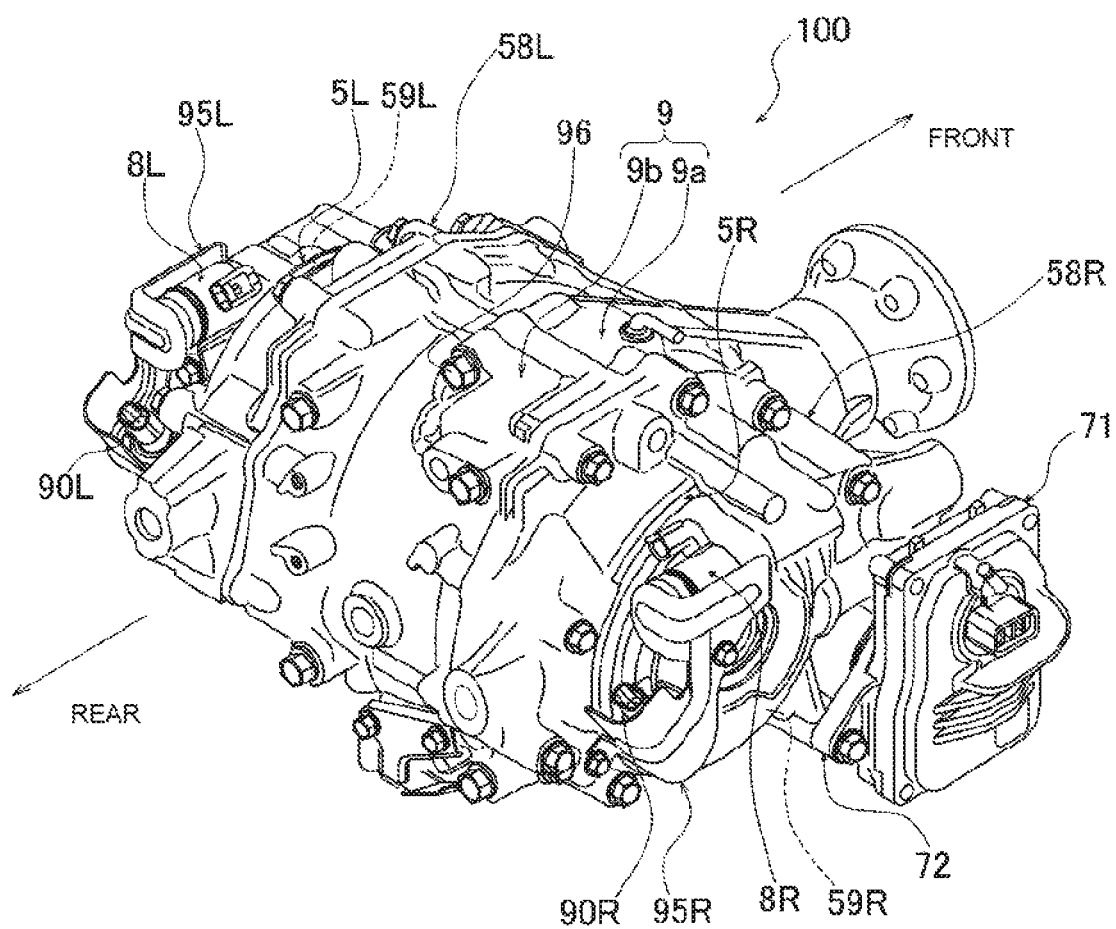
FIG. 2 is a perspective view showing the outer appearance configuration of the power transmission device.
Figure 3:
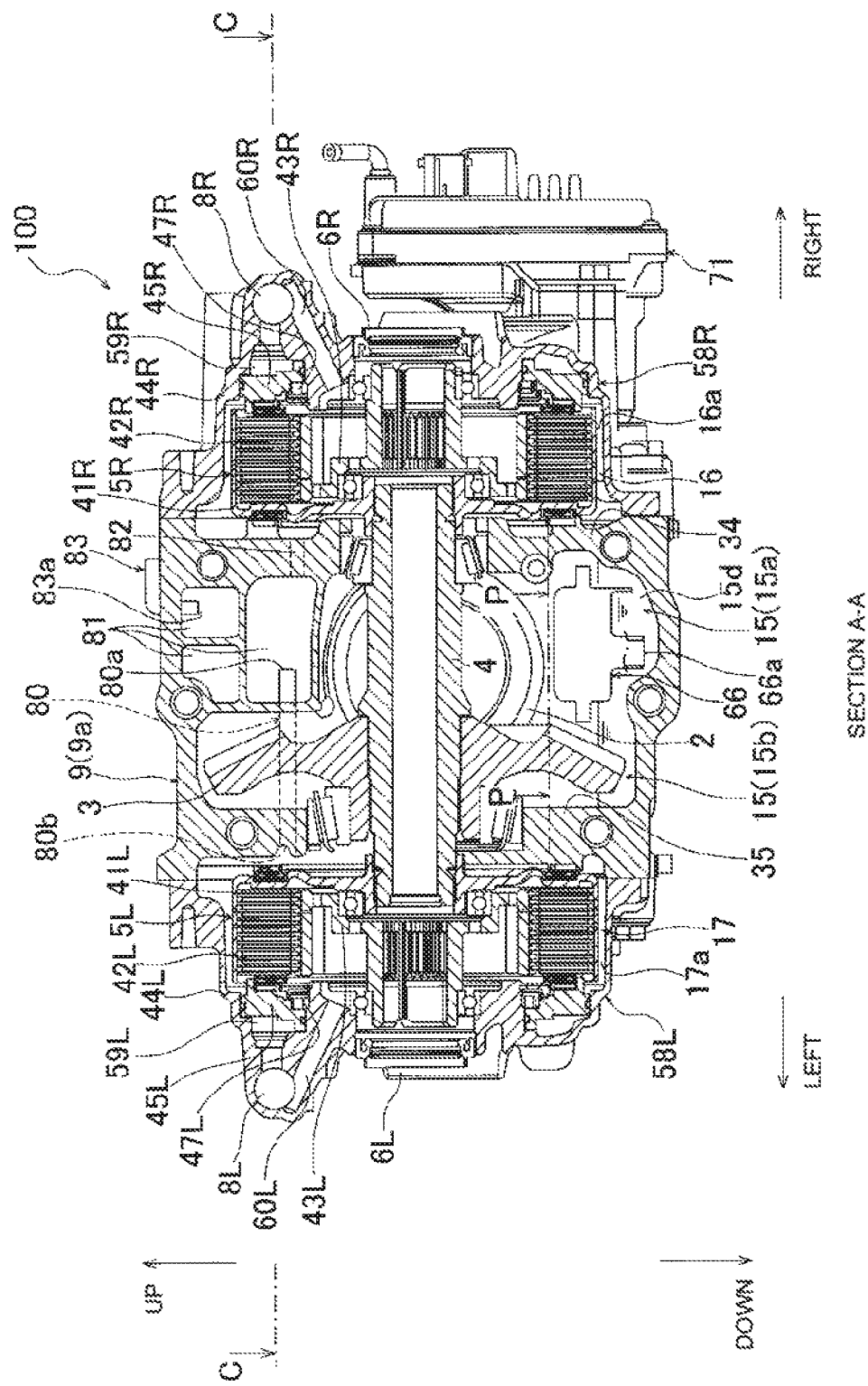
FIG. 3 is a cross-sectional (a cross-sectional view taken along line A-A of FIG. 1(*a*)) or the power transmission device.
Figure 4:
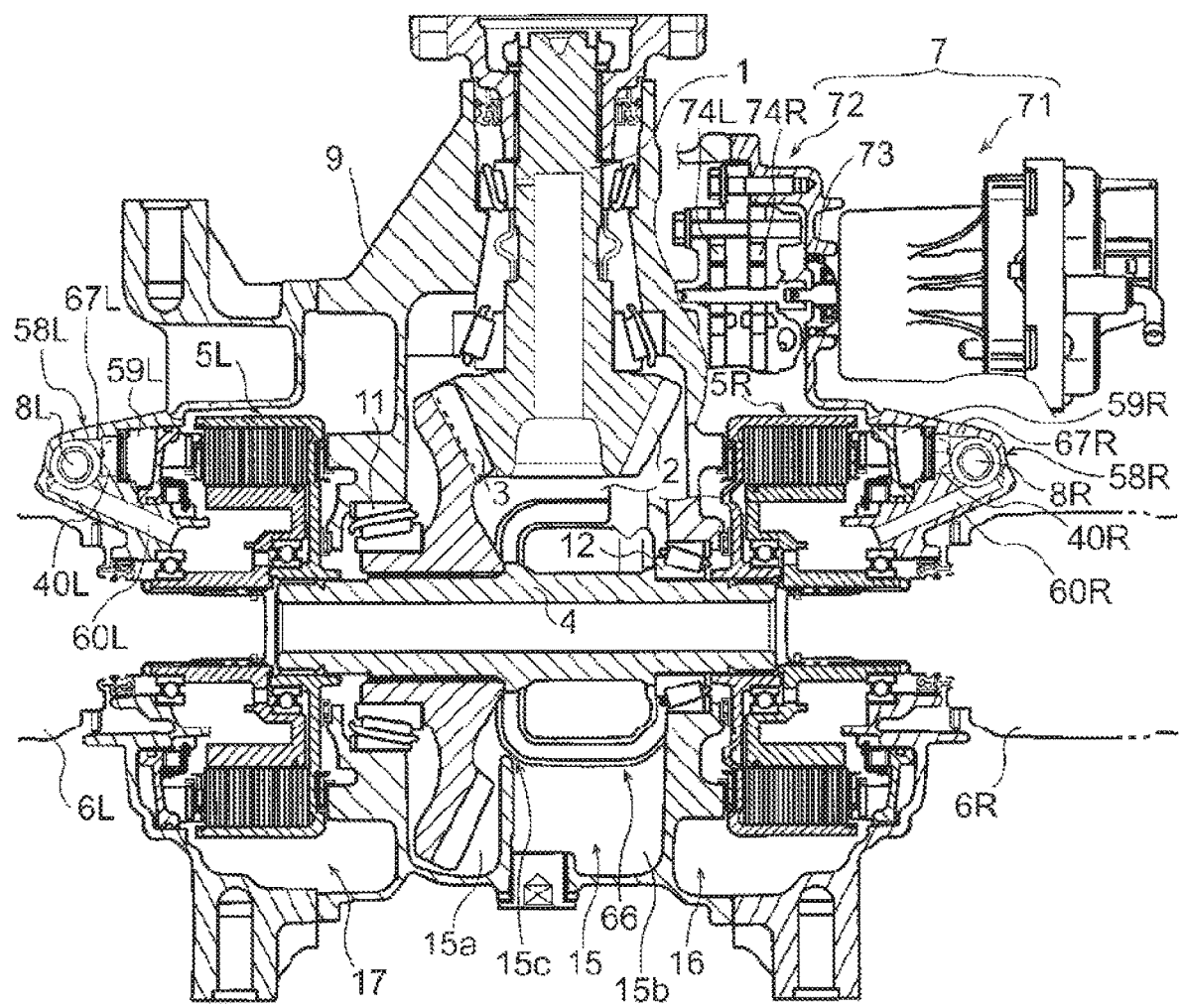
FIG. 4 is a cross-sectional view (a cross-sectional view taken along line B-B of FIG. 1(*b*)) of the power transmission device.

Preferred embodiments of the present invention will be described below with reference to the accompanying drawings. FIG. 1 is a view showing the outer appearance configuration of a power transmission device according to one embodiment of the present invention, in which (a) is a plan view and (b) is a side view. FIG. 2 is a perspective view showing the outer appearance configuration of the power transmission device. FIGS. 3 and 4 are cross-sectional views of the power transmission device, in which FIG. 3 is a cross-sectional view taken along line A-A of FIG. 1(*a*) and FIG. 4 is a cross-sectional view taken along line B-B of FIG. 1(*b*).

As shown in FIG. 4 or the like, the power transmission device 100 is configured as a differential mechanism distribute the rotation of a drive shaft 1 to right and left wheels (not shown). The drive shaft 1 is connected to a rear end of a propeller shaft (not shown) and a drive power from a drive source (an engine) (not shown) is transmitted to the drive shaft. The power transmission device 100 comprises a drive bevel gear (a pinion gear) 2 integrally rotated with the drive shaft 1, a driven bevel gear (a ring gear) 3 adapted to mesh with the drive bevel gear 2, a center shaft (a rotary shaft) 4 disposed perpendicularly to the drive shaft 1 and connected to integrally rotated with the driven bevel gear 3, right and left hydraulic clutches 5L, 5R disposed on the right and left sides of the center shaft 4, right and left wheel axes 6L, 6R adapted to transmit each drive power transmitted by the right and left hydraulic clutches 5L, 5R to the right and left wheels (not shown) respectively, an oil pump (an electric oil pump) 7 adapted to feed hydraulic oil to each piston chamber 59L, 59R of the right and left hydraulic clutches 5L, 5R, and right and left pressure regulation valves 8L, 8R adapted to regulate the pressure of the oil discharged from each piston chamber 59L, 59R. The power transmission device 100 is also provided with a center case (a body case) 9 for housing a differential mechanism and side cases 58L, 58R for housing the right and left hydraulic clutches 5L, 5R respectively. As shown in FIG. 1(a) and FIG. 2, the center case 9 consists of a front case 9a and a rear case 9b divided into two at the center in the longitudinal direction and these front and rear cases 9a, 9b are joined longitudinally and are integrally secured by tightening a bolt 96. The right and left side cases 58L, 58R are integrally secured at right end and left end openings of the center case 9 by tightening bolts 97 see FIG. 1(a)). Further, in the following description, when referring to the axial direction of the rotary shaft or simply referring to the axial direction, it shall show the axial direction (the horizontal direction in FIG. 1) of the center shaft 4. Each constitution will be further described below.

The driven bevel gear 3 is attached to the outer circumference of the center shaft 4 which is coaxially arranged with the left wheel axis 6L and the right wheel axis 6R. Accordingly, when the drive shaft 1 is driven to rotate through the engine and the propeller shaft, the drive power is transmitted to the center shaft 4 through the drive bevel gear 2 and the driven bevel gear 3 to rotate the center shaft 4.

Formed within the center case 9 is a gear chamber 15 which is disposed at the center of the center shaft 4 in the axial direction. Also, formed within the right and left side cases 58L, 58R is a pair of clutch chambers 16, 17 which is disposed on both sides of the gear chamber 15 respectively. With this, a casing of the power transmission device 100 is divided into three chambers of the gear chamber 15 and a pair of clutches 16, 17.

The gear chamber 15 has a gear housing section 15a that is a chamber in which the driven bevel gear 3 described above is installed, and a strainer housing section 15b that is a chamber which part of the drive bevel gear 2 and an oil strainer 66 are installed. The gear housing section 15a is situated on the left side within the gear chamber 15 and adjacent to the right side of the left clutch chamber 17. On the other hand, the strainer housing section 15b is situate the right side within the gear chamber 15 and adjacent to the left side of the right clutch chamber 16. The gear housing section 15a and the strainer housing section 15b communicate with each other at a boundary section 15c (see FIG. 4) therebetween and these gear housing section 15a and strainer housing section 15b form the gear chamber 15.

As shown in FIG. 3 or the like, the right and left clutch chambers 16, 17 are respectively provided with the hydraulic clutch 5L and the hydraulic clutch 5R. The hydraulic clutch 5R within the right clutch chamber 16 comprises a substantially cylindrical clutch drum (clutch housing) 41R connected to the right end section of the center shaft 4, a clutch hub 43R splined to the end section of the right wheel axis 6R on the inner circumferential side of the clutch drum 41R, and a friction engagement section 42R composed of a plurality of friction plates laminated alternately within the clutch drum 41R along the axial direction. Also, provided at a position adjacent to the friction engagement section 42R are a piston housing 44R integrally formed with the right side case 58R, a cylinder piston 45R housed within the piston housing 44R, and a return spring 47R adapted to energize the cylinder piston 45R. Within the piston housing 44R, there is formed a piston chamber 59R and hydraulic oil is introduced between the cylinder piston 45R and the piston chamber 59R. Although a detailed description is omitted, the hydraulic clutch 5L disposed within the left clutch chamber 17 also has the same constitution as that of the hydraulic clutch 5R (Reference signs of the constituent elements of the hydraulic clutch 5L are provided with a suffix "L").

As shown in FIG. 3, the center case 9 is provided with a breather chamber 81 for air vent on the outside (the upper side) of the rotary shaft 4 in the radial direction. Attached to the breather chamber 81 is a breather pipe 83 adapted to communicate with the outside of the power transmission device 100. The breather pipe 83 is bent in a substantially L-shape as a whole and a section inserted into the breather chamber 81 penetrates an upper wall section of the breather chamber 81 and extends downward, wherein the lower end thereof is provided with an intake port 83a into which air is sucked. On the other hand, section of the breather pipe 83 exposed to the outside of the breather chamber 81 and the power transmission device 100 laterally extends along the upper wall of the center case 9 and the tip end is open to the atmosphere. In the cross-section shown in FIG. 3, the breather chamber 81 is divided into three chambers (three sections) of the right and left upper two chambers and the lower one chamber, but, in reality, these three chambers (three sections) are connected to each other at a section other than the cross section shown here (at a position on the front side of the sheet of FIG. 3), thereby forming one chamber. Thus, oil is made to freely flow among the three chambers (three sections).

As shown in FIG. 4 or the like, the electric oil pump 7 is composed of a motor section 71 generating rotary power and a pump section 72 adapted to suck the hydraulic from the oil strainer 66 by the rotary power and to feed it using a pressure to the right and left hydraulic clutches 5L, 5R, wherein the pump section 72 has a double pump structure in which two inscribed gear pumps (oil pumps) of right and left 74L, 74R are connected in series on a pump shaft 73. Connected to the oil pumps 74L, 74R are oil passages (not shown) which extend on the downstream side to communicate with the right and left piston chambers 59L, 59R of the right and left hydraulic clutches (clutch device) 5L, 5R. Accordingly, the left inscribed gear pump 74L feeds oil using a pressure to the piston chamber 59L of the left hydraulic clutch 5L, while the right inscribed gear pump 74R feeds oil using a pressure to the piston chamber 59R of the right hydraulic clutch 5R.

The right and left pressure regulation valves 8L, 8R are linear solenoid valves (electromagnetic pressure regulation valves). The right and left pressure regulation valves 8L, 8R in the present embodiment, as shown in FIGS. 1 and 2 or the like, are inserted and installed in mounting holes (not shown) provided on the side cases 58L, 58R and are arranged with substantially symmetry right beside each piston chamber 59L, 59R of the right and left hydraulic clutches 5L, 5R. In this manner, the oil passages 67L, 67R from the right and left piston chambers 59L, 59R to the right and left pressure regulation valves 8L, 8R are formed the shortest distance. Further, oil passages 67 L, 67R between the piston chambers 59L, 59R and the pressure regulation valves 8L, 8R are provided with filters (secondary filters: cleaning members) 40L, 40R for removing minute foreign substances contained in the hydraulic oil circulating through the oil passages 67L, 67R.

Also, formed inside the side cases 58L, 58R are lubrication oil passages 60L, 60R for introducing the oil discharged from the pressure regulation valves 8L, 8R to the inside of the hydraulic clutches 5L, 5R. Namely in the power transmission device 100 of the present embodiment, the oil discharged from the pressure regulation valves 8L, 8R is introduced directly to the inside of the hydraulic clutches 5L, 5R through the lubrication oil passages 60L, 60R, not through the oil passage (axis center oil passage) formed inside the center shaft 4, and the introduced oil is caused to stir by the rotation of the clutch hubs 43L, 43R, thereby lubricating the rotation sliding section of the hydraulic clutches 5L, 5R.

Further, provided in the vicinity of a bottom section 15d (see FIG. 3) of the gear chamber 15 is the oil strainer 66. The oil strainer 66 is provided on its undersurface with a suction port 66a for sucking the hydraulic oil is made to suck the hydraulic oil accumulated at the bottom section 15d within the gear chamber 15.

Still further, the right and left piston chambers 59L, 59R are provided with hydraulic sensors 90L, 90R for detecting the oil pressure within the piston chambers 59L, 59R. The hydraulic sensor 90 is provided in such a manner that a sensor section on the root side is inserted and installed into the other mounting hole (not shown) formed on the side case 58. By disposing the sensor section within the piston chambers 59L, 59R through the mounting hole, the hydraulic sensors 90L, 90R are made to detect the oil pressure within the piston chambers 59L, 59R. Also, there are provided covers (protecting members) 95L, 95R to cover at least part of the pressure regulation valves 8L, 8R and the hydraulic sensors 90L, 90R exposed from the side cases 58L, 53R.

Figure 5:
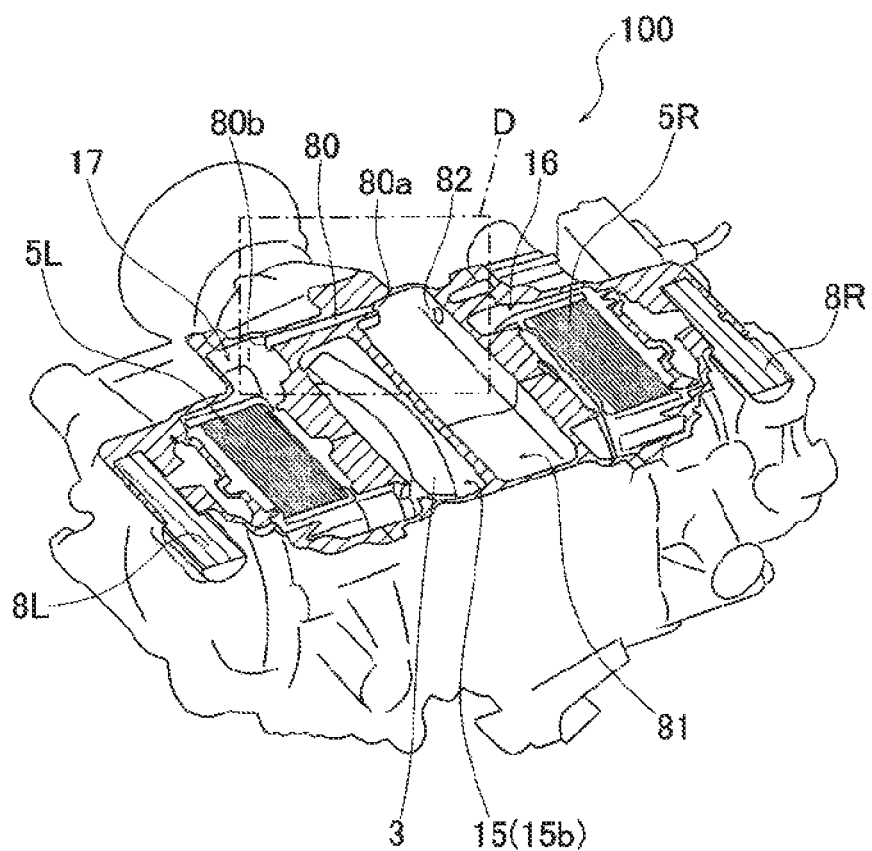
FIG. 5 is a perspective plan view showing the cross section of a section taken along line C-C of FIG. 3.
Figure 6:
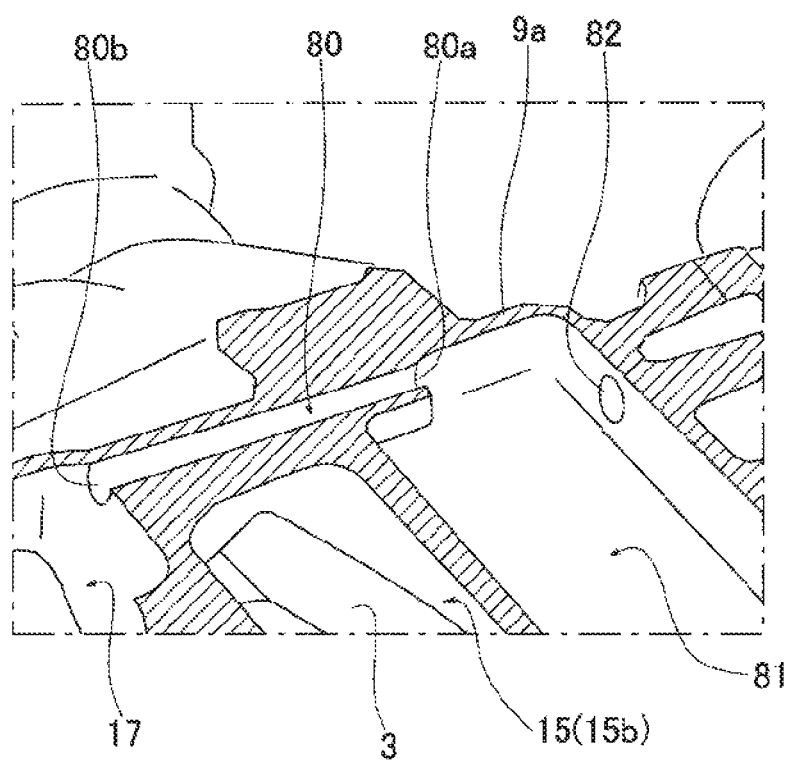
FIG. 6 is an enlarged view of a communication passage section (D section) of FIG. 5.

FIG. 5 is a perspective view showing a structure of the breather chamber 81 and a communication passage 80 adapted to communicate with the breather chamber 81 (shows the cross section of a section taken along line C-C of FIG. 3) and FIG. 6 is an enlarged view of the communication passage section of FIG. 5.

As shown in FIG. 3, FIG. 5 and FIG. 6, a front case 9a of the center case 9 is provided with a first communication passage 80 of which the cross section is formed in a substantially circular, cylindrical shape facing the horizontal direction. A suction port 80a of one end (the right end) of this communication passage 80 opens to the breather chamber 81, while a discharge port 80b of the other end (the left end) opens to the clutch chamber 17. As shown in FIG. 6, the first communication passage 80 is provided on the side end section close to the drive shaft 1 of breather chamber 81 and the suction port 80a projects into the breather chamber 81 by a predetermined length (this projection length will be described later).

In the breather chamber 81, there is a possibility that the oil intruded into the breather chamber from the gear chamber 15 and the clutch chamber 17 may spout out to the outside through the breather pipe 83 provided within the breather chamber 81. In this connection, in the present embodiment, by providing the first communication passage 80 between the breather chamber 81 and the clutch chamber 17, the oil intruded into the breather chamber 81 is sucked into the first communication passage 80 by the negative pressure generating bar the pull-in due to the rotation of the clutch 5L within the clutch chamber 17 and is made to return again to the clutch chamber 17. With this, it is possible to effectively suppress the oil from spouting out of the breather pipe 83.

Figure 7:
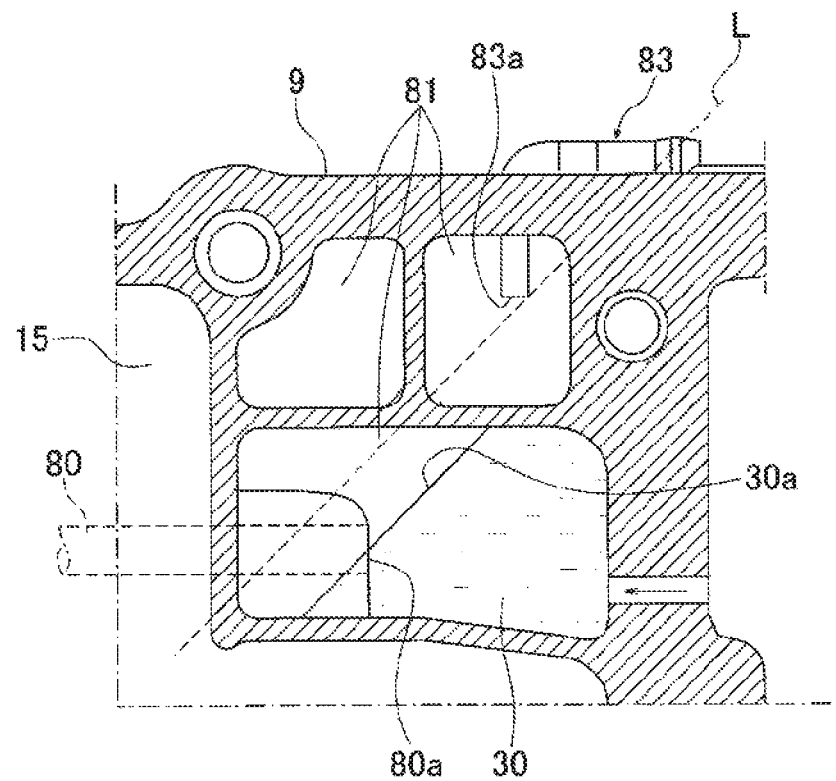
FIG. 7 is a cross-sectional view showing a positional relationship between a suction port of a communication passage and an intake port of a breather pipe.

FIG. 7 is a cross-sectional view showing a positional relationship between the suction port 80a of the first communication passage 80 and an intake port 83a of the breather pipe 83. As shown in the figure, the oil 30 intruded into the breather chamber 81 moves in the right and left direction within the breather chamber 81 due to the turning of the vehicle and the oil level becomes an inclined surface inclining with respect to the horizontal direction (i.e., the axial direction of the center shaft 4). In this case, when the vehicle is turning to the left, at the time when the oil level 30a of the oil 30 moved at a position of a dotted line L of FIG. 7, that is, at a position in which it reached the intake port 83a of the breather pipe 83, if the oil level 30a has not yet reached the suction port 80a of the communication passage 80, the oil 30 still remains within the breather chamber 81 and spouts out to the outside from the intake port 83a of the breather pipe 83. In order to avoid such a phenomenon, as shown in FIG. 7, it is necessary to situate the suction port 80a of the first communication passage 80 in such a manner that the oil level 30a can reach the suction port 80a of the first communication passage 80 prior to reaching the intake port 83a of the breather pipe 83. By causing the communication passage 80 to project into the breather chamber 81 in such a positional relationship, the oil is made to be sucked from the suction port 80a of the first communication passage 80 prior to reaching the intake port 83a of the breather pipe 83, thereby capable of surely preventing the oil from spouting out to the outside from the breather pipe 83.

Figure 8:
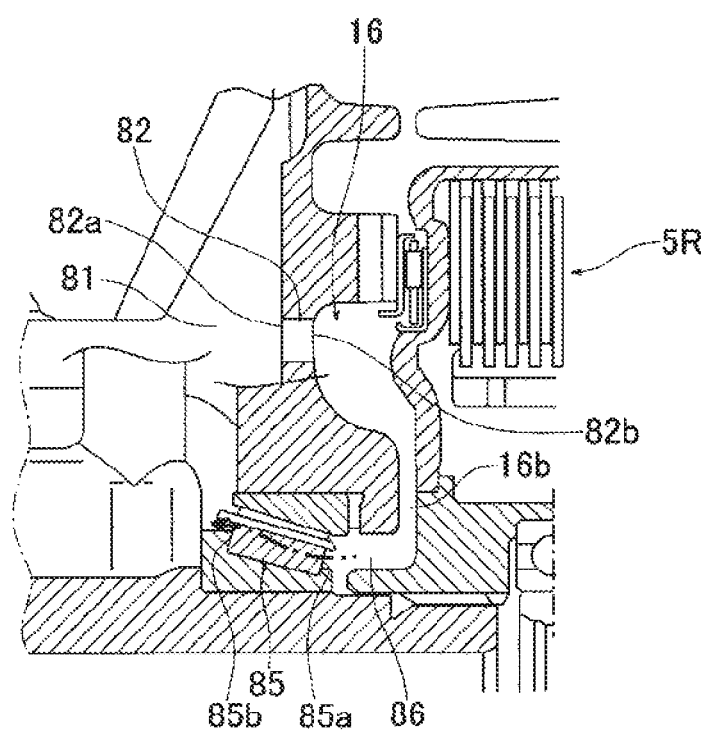
FIG. 8 is a cross-sectional view showing another embodiment of the present invention.

FIG. 8 is a cross-sectional view showing another communication passage formed in the breather chamber 81. As shown in FIG. 3 and FIG. 8, a second communication passage 82 is formed on the right side wall of the breather chamber 81 to communicate with the right clutch chamber 16. A suction port 82a provided at one end (left end) of this second communication passage 82 opens to the breather chamber 81, while the other end (right end) opens to the clutch chamber 16. Further, a taper roller bearing 85 supporting the rotary shaft 4 to the center case (body case) 9 is housed in a bearing housing chamber 86. The bearing housing chamber 86 and the clutch chamber 16 communicate with each other through an inside section 16b of the clutch chamber 16. Still further, the taper roller bearing 85 installed within the bearing housing chamber 86 is provided in such a manner that the small diameter side 85a is disposed on the second communication passage 82 (clutch chamber 16) side, while the large diameter side 85b is disposed on the gear chamber 15 side. With this arrangement, the oil intruded into the breather chamber 81 from the clutch chamber 16 or the like is sucked into the second communication passage 82 and, by the negative pressure generating by the rotation of the taper roller bearing 85, oil is pulled into the clutch chamber 16 and passes through the inside section 16b and flows from the small diameter side 85a to the large diameter side 85b of the taper roller bearing 85 and enters the gear chamber 15 to be stored as the hydraulic oil. Since the oil in the breather chamber 81 can be effectively returned to the gear chamber 15 even by the flow of oil through this second communication passage 82 and the bearing housing chamber 86, it is possible to suppress oil from spouting out of the breather pipe 83 to the outside.

As describe above, according to the power transmission device 100 of the present embodiments, providing the first communication passage 80 adapted to communicate with the clutch chamber 17 for housing the hydraulic clutch 5L disposed on the end section of the rotary shaft 4 in the axial direction and the breather chamber 81 disposed outside the rotary shaft 4, the oil intruded into the breather chamber 81 from the clutch chamber 17 or the like enters the first communication passage 80 and is returned to the clutch chamber 17 by the negative Pressure generating by the pull-in due to the rotation of the hydraulic clutch 5L, thereby capable of preventing the oil from spouting out of the breather pipe 83 to the outside. Further, even in the case where rotary parts like a gear other than the clutch 5L are housed in a rotary parts housing chamber corresponding to the clutch chamber 17, the oil is returned to the rotary parts housing chamber in the same principle, thereby capable of preventing the oil from spouting out of the breather pipe 83. In this manner, in the present embodiments, since the return property of the oil intruded into the breather chamber 81 to the gear chamber 15 through the rotary parts housing chamber such as the clutch chamber 17 improves, it is possible to effectively prevent the oil from spouting out of the breather pipe 33 to the outside.

Also, in this power transmission device 100, by providing the first communication passage 80 in such a manner that the level of oil intruded into the breather chamber 81 at turning of the vehicle reaches the positron of the suction port 80*a* of the first communication passage 80 prior to reaching the intake port 83*a* of the breather pipe 83 for air blow off from the breather chamber 81, since oil is sucked from the suction port 80*a* of the first communication passage 80 before the oil level 30*a* of the oil 30 contacts the intake port 83*a* of the breather pipe 83 at turning of the vehicle, it is possible to surely prevent the oil from spouting out of the breather chamber 81 to the outside.

Further, according to the power transmission device 100 of the present embodiments, by providing the second communication passage 82 adapted to communicate with the bearing housing chamber 86 for housing the taper roller bearing 85 which supports the rotary shaft 4 to the center case (body case) 9 and the breather chamber 81, oil intruded into the breather chamber 81 from the clutch chamber 17 or the like enters the second communication passage 82, wherein, by the negative pressure generating by the pull-in due to the rotation of the taper roller bearing 85, the oil is sucked into the second communication passage 82 to be intruded into the bearing housing chamber 86 and then, flows from the small diameter side 85*a* of the taper roller bearing 85 to the large diameter side 85*b* and drops on the gear chamber 15 to be stored as the hydraulic oil. With this, even in the other embodiment, it is possible to prevent oil from spouting of the breather pipe 83. In this manner, since the return property of the oil to the bearing housing chamber improves, oil no longer spouts out of the breather chamber 81 to the outside and environmental pollution can be prevented.

Still further, according to the power transmission device 100 of the present embodiments, by providing the bearing housing chamber 86 on the inner peripheral section of the rotary parts housing chamber such as the clutch chamber 16, the bearing housing chamber 86 is no longer necessary and it can double as the clutch chamber 16.

While preferred embodiments of the present invention have been shown and described above, the present invention is not limited to the above-mentioned embodiments and various modifications may be made within the scope of claims and the technical ideas stated in the description and drawings.

For example, in the above embodiments, the first communication passage 80 is made to communicate with the breather chamber 81 and the clutch chamber 17, but in the case where, for example, the gear and other rotary parts other than the hydraulic clutch 5L are housed in the rotary parts housing chamber of an area corresponding to the clutch chamber 17, the first communication passage can be provided between this rotary parts housing chamber and the breather chamber 81.

Further, in the above embodiments, the second communication passage 82 is made to communicate with breather chamber 81 and the bearing housing chamber 86 through the right clutch chamber 16, but beside the above, the second communication passage can be made to communicate directly with the breather chamber and the bearing housing chamber not through the clutch chamber.

The invention claimed is:

1. A power transmission device mounted on a vehicle, comprising:
    a rotary shaft extending in a vehicle width direction of the vehicle to transmit driving power to wheels of the vehicle for driving the wheels;
    a gear disposed on the rotary shaft to transmit the power to the rotary shaft;
    a gear chamber housing therein the gear;
    first and second rotary parts housing chambers each housing therein rotary parts including a clutch and disposed on respective ends of the rotary shaft in an axial direction thereof or in a vicinity of the respective ends; and
    a breather chamber provided with the gear chamber and communicating with an outside of the power transmission device;
    a taper roller bearing configured to support the rotary shaft to a case of the power transmission device;
    a bearing housing chamber housing therein the taper roller bearing and communicating with each of the gear chamber and the second rotary parts housing chamber;
    a first communication passage connecting the breather chamber and the first rotary parts housing chamber such that the breather chamber and the first rotary parts housing chamber are communicated with each other; and
    a second communication passage connecting the breather chamber and the second rotary parts housing chamber such that the breather chamber and the second rotary parts housing chamber are communicated with each other.

2. The power transmission device according to claim 1, further comprising:
    a breather pipe having an intake port and communicating with the breather chamber and an outside of the breather chamber via the intake port, wherein
    the communication passage has a suction port which is positioned such that a level of oil intruded into the breather chamber at turning of the vehicle reaches the suction port of the communication passage prior to reaching the intake port of the breather pipe within the breather chamber.

3. The power transmission device according to claim 1, wherein the taper roller bearing has a small diameter side and a large diameter side which is larger in diameter than the small diameter side, the taper roller bearing being disposed such that the small diameter side is disposed on a side of the communication passage within the bearing housing chamber and the large diameter side is disposed on a side of the gear chamber.

4. The power transmission device according to claim 1, wherein the first rotary parts housing chamber is a left-side clutch chamber housing therein a left-side clutch and the second rotary parts housing chamber is a right-side clutch chamber housing therein a right-side clutch.

5. The power transmission device according to claim 1, wherein the first communication passage is a hole formed in the case of the power transmission device.

* * * * *